US012608017B2

(12) United States Patent
Tomabechi

(10) Patent No.: US 12,608,017 B2
(45) Date of Patent: Apr. 21, 2026

(54) COMMUNICATION SYSTEM FOR MOVERS, METHOD OF MAKING COMMUNICATION FOR MOVERS AND DRONE USED FOR THE COMMUNICATION SYSTEM

(71) Applicant: Cognitive Research Labs, Inc., Tokyo (JP)

(72) Inventor: Hideto Tomabechi, Tokyo (JP)

(73) Assignee: Cognitive Research Labs, Inc., Tokyo (JP)

( * ) Notice: Subject to any disclaimer, the term of this patent is extended or adjusted under 35 U.S.C. 154(b) by 65 days.

(21) Appl. No.: 18/752,006

(22) Filed: Jun. 24, 2024

(65) Prior Publication Data

US 2025/0044805 A1 Feb. 6, 2025

(30) Foreign Application Priority Data

Aug. 1, 2023 (JP) ................................. 2023-125381

(51) Int. Cl.
| | |
|---|---|
| *G05D 1/247* | (2024.01) |
| *G05D 1/698* | (2024.01) |
| *G05D 109/20* | (2024.01) |
| *G05D 111/10* | (2024.01) |
| *G06V 20/56* | (2022.01) |

(52) U.S. Cl.
CPC ........... *G05D 1/247* (2024.01); *G05D 1/6983* (2024.01); *G06V 20/56* (2022.01); *G05D 2109/20* (2024.01); *G05D 2111/10* (2024.01)

(58) Field of Classification Search
CPC ...... G05D 1/6985; G05D 1/225; G05D 1/104; B64U 80/70; B64C 39/024; H04N 23/665
See application file for complete search history.

(56) References Cited

U.S. PATENT DOCUMENTS

| | | | |
|---|---|---|---|
| 12,169,292 B2 * | 12/2024 | Biriuk | ..................... G05D 1/225 |
| 2020/0396377 A1 * | 12/2020 | Mondal | ................ H04N 23/665 |

(Continued)

FOREIGN PATENT DOCUMENTS

| | | | | |
|---|---|---|---|---|
| CN | 110362106 A | * | 10/2019 | ............. G05D 1/104 |
| JP | 2010-088033 A | | 4/2010 | |
| JP | 3224856 U | | 1/2020 | |

(Continued)

OTHER PUBLICATIONS

Extended European Search Report issued in European Patent Application No. 24184189.9, mailed on Dec. 11, 2024 (10 pages).

(Continued)

*Primary Examiner* — Yuri Kan

(74) *Attorney, Agent, or Firm* — NAKANISHI IP ASSOCIATES, LLC

(57) ABSTRACT

First and second movers can make communication with each other by means of a communication system in which a signal-receiving unit of the first mover receives from a satellite a signal indicative of a position coordinate of itself, a control unit of the first mover makes a pattern indicative of a position coordinate of the first mover, a display unit of the first mover displays the pattern, an image pickup unit of the second mover photographs the pattern, and a control unit of the second mover deciphers the thus photographed pattern to thereby control a position of the second mover in accordance with the thus deciphered pattern.

22 Claims, 15 Drawing Sheets

(56)         References Cited

U.S. PATENT DOCUMENTS

2023/0002082  A1*    1/2023   Shuff ..................... B64U 80/70
2024/0029292  A1      1/2024   Watanabe

FOREIGN PATENT DOCUMENTS

KR        20200048627  A  *  5/2020   ........... B64C 39/024
WO        2022/059605  A1    3/2022

OTHER PUBLICATIONS

Horyna Jiri et al. UVDAR-COM_UV-Based Relative Localization of UAVs with Integrated Optical Communication, 2022 International Conference On Unmanned Aircraft Systems (ICUAS), IEEE, (Jun. 21, 2022), pp. 1302-1308, EP034156083, DOI: 10.1109/ICUAS54217 .2022 .9836151 (7 pages).

* cited by examiner

RECEIVING SIGNAL INDICATIVE
OF POSITION COORDINATE — S110

MAKING PATTERN INDICATIVE
OF POSITION COORDINATE — S120

DISPLAYING POSITION COORDINATE
PATTERN IN DISPLAY PANEL — S130

PHOTOGRAPHING POSITION
COORDINATE PATTERN — S140

DECIPHERING POSITION
COORDINATE PATTERN — S150

MODIFYING FLIGHT PARAMETERS — S160

CONTROL
UNIT

COMMUNICATION SYSTEM FOR MOVERS, METHOD OF MAKING COMMUNICATION FOR MOVERS AND DRONE USED FOR THE COMMUNICATION SYSTEM

BACKGROUND OF THE INVENTION

Field of the Invention

The present invention relates to a communication system, a method of making communication for a plurality of movers, in particular, a plurality of flying objects, and a drone to be suitably employed for the communication system.

Description of the Related Art

Unmanned aircrafts, typically a drone, are now broadly employed, and expected to be drastically employed in the future.

For instance of public welfare use, drones are used for delivering goods in logistics industry, and used as an unmanned aircraft taxi.

Drones are employed not only for public welfare use, but also military use. In particular, in a present war, drones are now main weapons in place of conventional weapons.

Thus, each of military forces in a war frequently carries out electronic warfare (EW) for destroying electronic devices and/or jamming for invalidating functions of a drone to military drones of an enemy.

As drones are employed increasingly, there is increased necessity of accurately controlling motions of a drone, specifically, necessity of preventing a drone from being hacked.

For instance, if an unmanned aircraft taxi were hacked, a passenger might be caused to get off on a highway or on water with the result that safety of a passenger is threatened.

As an alternative, if a military drone were hacked, it might make a U-turn from an enemy or make a collision with another drone.

In particular, in military use, a swarm of drones including tens, hundreds or thousands of drones is increasingly used in place of a single drone.

In a swarm of drones, it is necessary to accurately grasp a relative positional relation among drones in order to avoid drones from making contact or collision with each other.

Thus, it is necessary for future drones to have a resistance to hacking, and particularly necessary to grasp accurate positions of drones in a swarm.

As an example, Japanese Patent Application Publication No. 2010-88033 suggested a system for grasping a position of a flying object.

In the suggested system, a helicopter is designed to have a radio-signal communication device by which a position of the helicopter is grasped, an area in which the helicopter is flying is grasped, and a station number corresponding to the area is recorded.

Japanese Utility Model Registration No. 3224856 suggested a communication system including a drone equipped with a radio-signal communication device, and an earth station equipped with a radio-signal communication device. The drone and the earth station make communication with each other at a frequency of 920 MHz to thereby enhance a communication speed.

As mentioned above, a position of a flying object itself was conventionally grasped generally through radio-signal communication.

A position control of drones in a swarm was conventionally carried out mainly through radio-signal control in order to avoid drones from making contact or collision with one another.

However, radio-signal communication is readily interfered or invalidated by jamming.

Accordingly, a communication system for drones is required to have a resistance against jamming and EW.

This is a common problem not only for drones, but also every moving objects such as flying objects and objects running on ground or water.

SUMMARY OF THE INVENTION

In view of the above-mentioned problem in a conventional communication system for moving objects, it is an exemplary object of the present invention to provide a communication system having a resistance against electronic interference such as jamming and EW. It is another exemplary object of the present invention to provide a method of making communication among a plurality of movers, in particular, a plurality of flying objects. It is still another exemplary object of the present invention to provide a drone to be suitably employed for the communication system.

In a first exemplary aspect of the present invention, there is provided a communication system to allow objects to make communication with each other, the objects including at least one first mover and at least one second mover, the communication system including a signal-receiving unit for receiving signals indicative of a position coordinate, a control unit and a display unit, all being included in the first mover, and an image pickup unit and a control unit, both being included in the second mover, the signal-receiving unit being able to make communication with a satellite, and receive from the satellite a signal indicative of a position coordinate of the first mover, the control unit of the first mover making patterns including a pattern indicative of a position coordinate of the first mover, the display unit displaying the patterns having been made by the control unit of the first mover, the image pickup unit photographing the patterns having been displayed by the display unit, the control unit of the second mover deciphering the patterns having been photographed by the image pickup unit to thereby control a position of the second mover in accordance with the thus deciphered patterns.

It is preferable that the control unit of the second mover makes patterns includes a pattern indicative of a position coordinate of the second mover, the second mover includes a display unit for displaying the patterns having been made by the control unit of the second mover, the first mover includes an image pickup unit photographing the patterns having been displayed by the display unit of the second mover, and the control unit of the first mover deciphers the patterns having been photographed by the image pickup unit of the first mover.

It is preferable that the control unit of the second mover makes patterns includes a pattern indicative of a position coordinate of the second mover, the second mover includes a display unit for displaying the patterns having been made by the control unit of the second mover, other second movers employ the image pickup unit to photograph the patterns having been displayed by the display unit of the second mover, and the control unit of each of the other second movers deciphers the patterns having been photographed by the image pickup unit.

It is preferable that the first mover includes six display units, the six display units being equipped with the first mover at forward and rear, left and right, and upward and downward in a direction in which the first mover moves.

It is preferable that the display unit is designed to be rotatable or pivotable around an axis in which the display unit is equipped with the first mover.

It is preferable that the display unit is designed to be movable on a body of the first mover along a predetermined path.

It is preferable that the second mover includes six display units, the six display units being equipped with the second mover at forward and rear, left and right, and upward and downward in a direction in which the second mover moves.

It is preferable that the display unit is designed to be pivotable around an axis in which the display unit is equipped with the second mover.

It is preferable that the display unit is designed to be movable on a body of the second mover along a predetermined path.

It is preferable that when the image pickup unit of the second mover photographs a pattern transmitted from the display unit of the first mover, the control unit of the second mover causes the display unit of the second mover to transmit a confirmation pattern indicative of receiving the pattern, and the image pickup unit of the first mover photographs the confirmation pattern.

It is preferable that the control unit of the first mover, when the first mover does not receive the confirmation pattern from the second mover within a predetermined period of time after having transmitted a pattern through the display unit of the first mover, increases a quantity of light of a pattern to be transmitted through the display unit of the first mover.

It is preferable that the display unit is designed to be rotatable or pivotable around an axis in which the display unit is equipped with the first mover, and the control unit of the first mover, when the first mover does not receive the confirmation pattern from the second mover within a predetermined period of time after having transmitted a pattern through the display unit of the first mover, causes the display unit of the first mover to rotate or pivot.

It is preferable that the display unit is designed to be movable on a body of the first mover along a predetermined path, and the control unit of the first mover, when the first mover does not receive the confirmation pattern from the second mover within a predetermined period of time after having transmitted a pattern through the display unit of the first mover, causes the display unit of the first mover to move.

It is preferable that the control unit of the first mover, when the first mover receives the confirmation pattern from the second mover within a predetermined period of time after having transmitted a pattern through the display unit of the first mover, decreases a quantity of light of a pattern to be transmitted through the display unit of the first mover.

It is preferable that the control unit of the first mover controls a transmission interval of the patterns in accordance with whether the first mover receives the confirmation pattern from the second mover after a pattern has been transmitted through the display unit of the first mover.

It is preferable that the objects further include at least one third mover and/or at least one object standing still on ground or on water, the third mover and/or the standing-still object including an image pickup unit for photographing the pattern displayed by the display unit of the first mover, and a control unit for deciphering the pattern having been photographed by the image pickup unit.

It is preferable that the control unit of the third mover or the standing-still object makes patterns includes a pattern indicative of a position coordinate of the third mover or the standing-still object, the third mover or the standing-still object includes a display unit for displaying the pattern, the first mover includes an image pickup unit for photographing the pattern displayed by the display unit of the third mover or the standing-still object, the control units of the first and second movers decipher the pattern having been photographed by the image pickup units of the first and second movers.

It is preferable that the third mover moves on ground or on water.

It is preferable that both of the first and second movers includes a flying object.

It is preferable that the flying object includes a drone.

In a second exemplary aspect of the present invention, there is provided a method of allowing a plurality of movers to make communication with one another, the objects including at least one first mover and at least one second mover, the method including the first mover receiving a signal from a satellite, the signal being indicative of a position coordinate of the first mover, the first mover making patterns including a pattern indicative of the position coordinate of the first mover, the first mover outside displaying the patterns, the second mover photographing the patterns, and the second mover deciphering the patterns to thereby control a position of the second mover in accordance with the thus deciphered patterns.

It is preferable that the method further includes the second mover making patterns including a pattern indicative of a position coordinate of the second mover:

the second mover outside displaying the patterns, the first mover photographing the patterns, and the first mover deciphering the thus photographed patterns.

It is preferable that the method further includes the second mover making patterns including a pattern indicative of a position coordinate of the second mover, the second mover outside displaying the patterns, and other second movers photographing the patterns having been displayed by the second mover, and the other second movers deciphering the thus photographed patterns to thereby control a position of itself in accordance with the deciphered patterns.

In a third exemplary aspect of the present invention, there is provided a drone capable of making communication with other drones, including a signal-receiving unit for receiving a signal from a satellite, the signal being indicative of a position coordinate of the drone, a control unit for making patterns including a pattern indicative of a position coordinate of the drone, and a display unit for displaying the thus made patterns to the other drones.

It is preferable that the other drones each includes a display unit for displaying a pattern indicative of a position coordinate of itself, and an image pickup unit for photographing the pattern having been displayed by the display unit of each of the other drones, the control unit deciphering the thus photographed pattern.

In a fourth exemplary aspect of the present invention, there is provided a drone capable of making communication with other drones, including an image pickup unit for photographing patterns displayed by the other drones, the pattern indicative of a position coordinate of each of the other drones, and a control unit for deciphering the thus photographed pattern to thereby control a position of the drone in accordance with the thus deciphered pattern.

It is preferable that the control unit makes patterns includes a pattern indicative of a position coordinate of the drone, the drone including a display unit for displaying the thus made patterns.

Advantages Obtained by the Invention

In the communication system in accordance with the present invention, a position coordinate of a first drone, obtained from a satellite, is transmitted to a second drone as an optical signal (a constant pattern of lights transmitted from a display unit).

Since an optical signal is not interfered by jamming and EW unlike a radio-signal (an electromagnetic signal), the communication system in accordance with the present invention makes it possible to surely transmit a position coordinate of a first drone to a second drone. The second drone can fly grasping a position of the first drone, and hence, it is possible to avoid interference or collision between the first and second drones.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 6 illustrates a positional relation among drones in a swarm in the communication system in accordance with second exemplary embodiment.

FIG. 8 is a longitudinal section drawing (viewed from a front) showing a structure of a second drone in the communication system in accordance with third exemplary embodiment.

DESCRIPTION OF THE EXEMPLARY EMBODIMENTS

Exemplary embodiments in accordance with the present invention will be explained hereinbelow with reference to drawings.

First Exemplary Embodiment

The communication system in accordance with the first exemplary embodiment is applied to a drone formation including a first drone 100 and a second drone 200.

Figure 1:
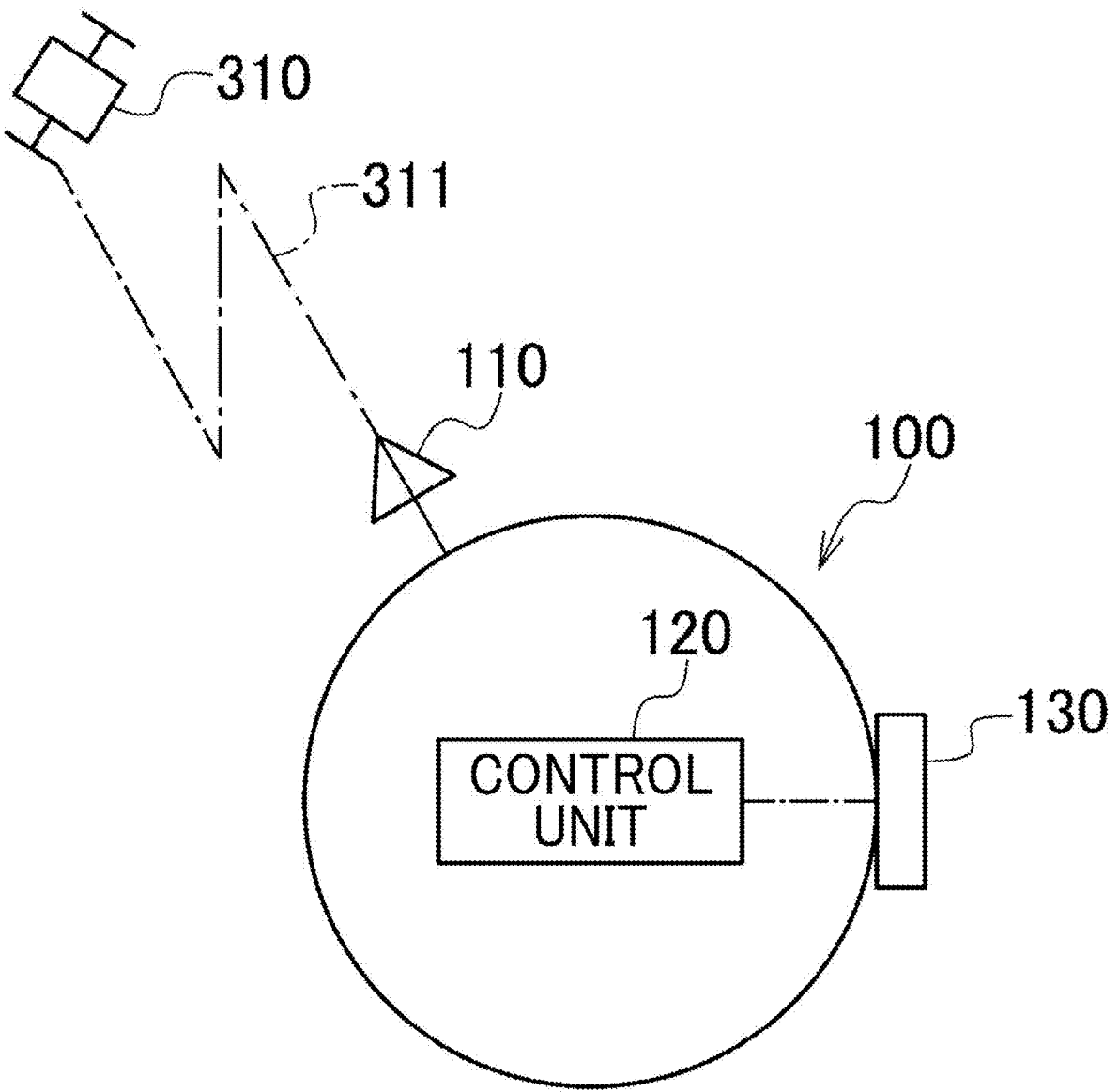
FIG. 1 is a longitudinal section drawing (viewed from a front) showing a structure of a first drone in the communication system in accordance with the first exemplary embodiment.

FIG. 1 is a longitudinal section drawing (viewed from a front) showing a structure of the first drone 100.

The first drone 100 is designed to be able to make communication with a GPS satellite 310. The first drone 100 includes a signal-receiving unit 110 for receiving a signal 311 indicative of a position coordinate signal (for instance, an optical pulse signal) of the first drone 100, from the GPS satellite 310, a control unit 120, and a display panel 130.

The control unit 120 controls operation of both the first drone 100 and the display panel 130 in accordance with instructions received from an operator (for instance, a base station located on ground).

As illustrated in FIG. 1, the display panel 130 is equipped on a body of the first drone 100 so as to face the right when viewed from a front in a direction in which the first drone 100 flies.

The display panel 130 is comprised of a liquid crystal display (LCD) panel, for instance.

The control unit 120 makes a position coordinate pattern indicative of a position coordinate of the first drone 100 indicated in the signal 311 having been received by the signal-receiving unit 110. A position coordinate pattern comprises a dot pattern including white and black dots, a line or matrix of letters and/or figures, or a one-dimensional or two-dimensional bar code, for instance.

The control unit 120 causes the display panel 130 to display the position coordinate pattern. The display panel 130 continuously or intermittently transmits a light (or a beam, a pulse) in a form of the position coordinate pattern.

The signal-receiving unit 110 is designed to not only receive the signal 311 from the GPS satellite 310, but also transmit signals to the GPS satellite 310.

Figure 2:
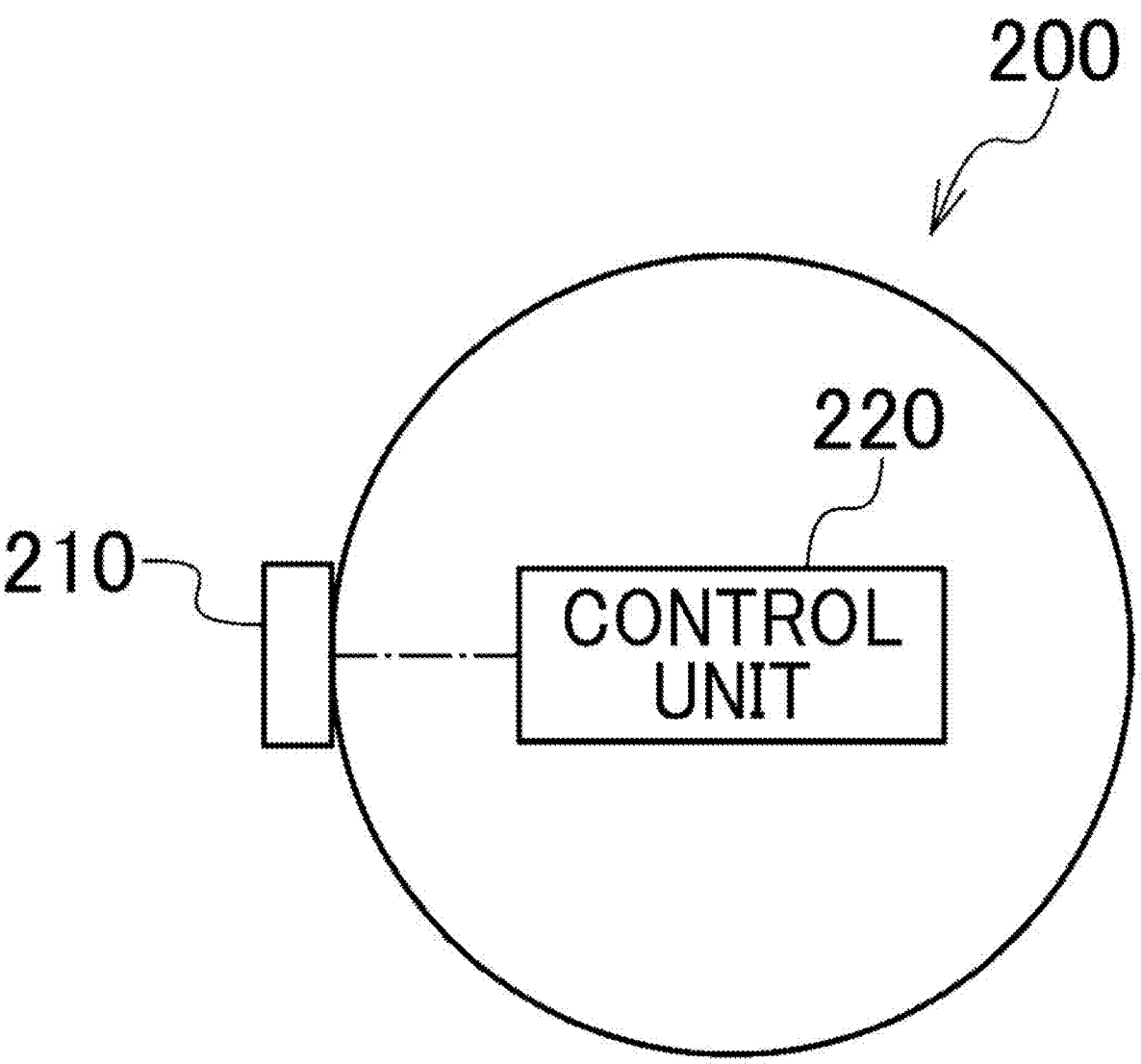
FIG. 2 is a longitudinal section drawing (viewed from a front) showing a structure of a second drone in the communication system in accordance with first exemplary embodiment.

FIG. 2 is a longitudinal section drawing showing a structure of the second drone 200.

The second drone 200 includes an image pickup unit 210 for photographing a position coordinate pattern displayed in the display panel 130 of the first drone 100, and a control unit 220 for deciphering the position coordinate pattern having been photographed by the image pickup unit 210 to thereby control operation of the second drone 210 in accordance with the instructions indicative of the deciphered position coordinate pattern.

The image pickup unit 210 is equipped on a body of the second drone 200 so as to face the left.

In the communication system in accordance with the first exemplary embodiment, a communication unit is selected in line with a distance between the first drone 100 and an object with which the first drone 100 attempts to make communication. Specifically, an optical pulse is used in a long distance communication such as a communication between the first drone 100 and the GPS satellite 310, and light emission in a pattern to be transmitted from the display panel 130 is selected in a short distance communication such as a communication between the first drone 100 and the second drone 200.

The communication system in accordance with the first exemplary embodiment includes the signal-receiving unit 110, the control unit 120, and the display panel 130 of the first drone 100 as a signal transmitter, and further includes the image pickup unit 210 and the control unit 220 of the second drone 200 as a signal receiver.

Figure 3:
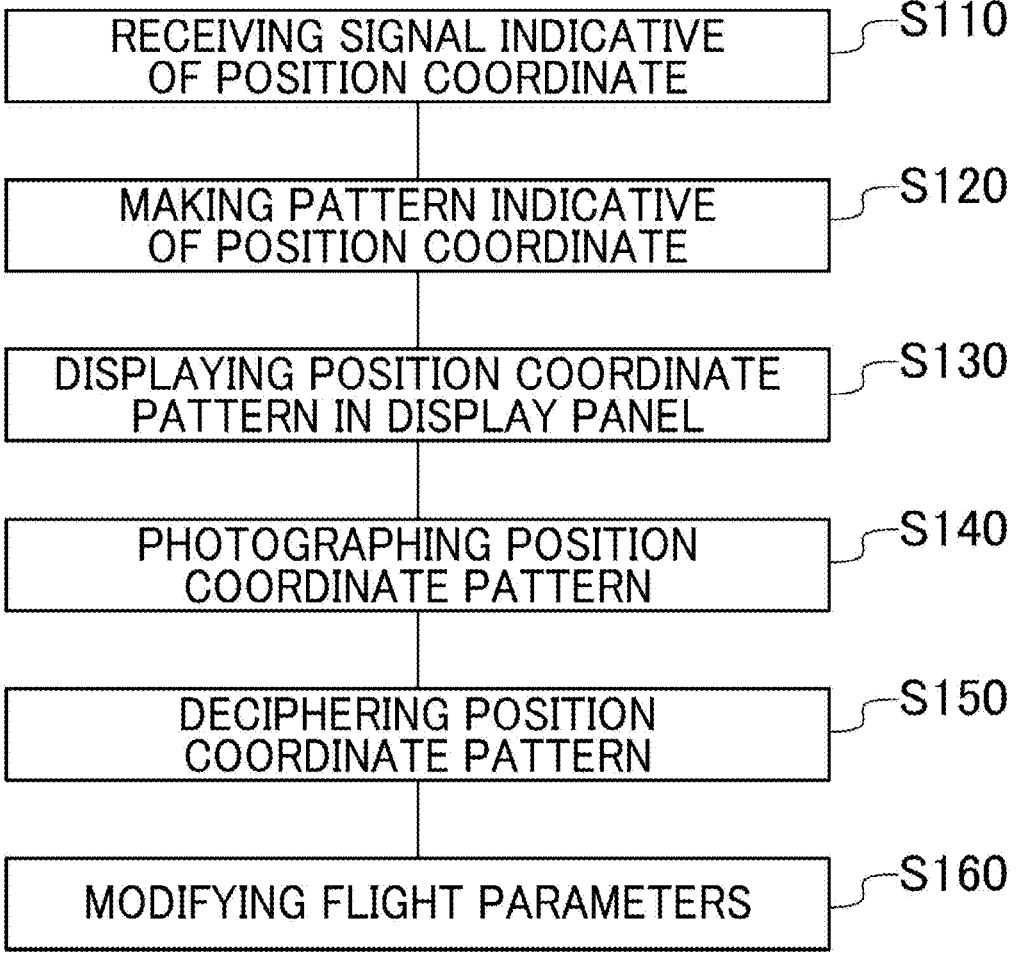
FIG. 3 is a flowchart showing actions to be carried out in the communication system in accordance with the first exemplary embodiment.

FIG. 3 is a flowchart showing actions to be carried out in the communication system. The operation of the communication system is explained hereinbelow with reference to FIG. 3.

It is supposed that the second drone 200 is flying at the right (the right side of FIG. 1) of the first drone 100. Consequently, the display panel 130 of the first drone 100 and the image pickup unit 210 of the second drone 200 face each other.

As illustrated in FIG. 1, the signal-receiving unit 110 of the first drone 100 receives the signal 311 indicating a position coordinate of the first drone 100 from the GPS satellite 310 (step S110).

Then, the control unit 120 of the first drone 100 converts the thus received signal 311 into a position coordinate pattern in accordance with a predetermined rule (step S120). The position coordinate pattern comprises a dot pattern, for instance.

Then, the control unit 120 of the first drone 100 causes the display panel 130 to display the thus converted position coordinate pattern (step S130). The display panel 130 emits a light (a beam or a pulse) conforming to the position coordinate pattern.

Since the display panel 130 of the first drone 100 and the image pickup unit 210 of the second drone 200 face each other, the image pickup unit 210 of the second drone 200 photographs the position coordinate pattern having been displayed in the display panel 130 (step S140).

Then, the control unit 220 of the second drone 200 deciphers or decodes the thus photographed position coordinate pattern to thereby obtain a position coordinate of the first drone 100 (step S150).

The control unit 220 of the second drone 200 modifies parameters relating to a flight of the second drone 200 such as a flying speed and a direction in which the second drone 200 should fly, in accordance with the position coordinate of the first drone 100 to thereby keep a distance between the second drone 200 and the first drone 100 to a predetermined distance to control a flight of the second drone 200 so as to prevent contact and/or collision with the first drone 100 (step S160).

As having been explained so far, a position coordinate of the first drone 100 is transmitted to the second drone 200 in the form of an optical signal (a light, a beam or a pulse in a predetermined pattern transmitted from the display panel 130).

Since an optical signal cannot be interfered with EW and jamming unlike a radio-signal (an electromagnetic signal), the communication system in accordance with first exemplary embodiment makes it possible to surely transmit a position coordinate of the first drone 100 to the second drone 200, thereby preventing contact and/or collision between the first drone 100 and the second drone 200.

Since an electromagnetic signal transmitter uses a long-wave signal of high directivity, it has a disadvantage that it can be easily found, and hence, a place where the transmitter is located can be easily detected.

In contrast, an optical signal transmitter uses a short-wave signal of short directivity, it has an advantage that the transmitter is difficult to be found, and hence, a place where the transmitter is located is hardly detected.

In addition, since a light in a nano-meter order, used in optical communication, is characterized by high diffusion and absorption, it cannot be detected in a distance greater than a predetermined distance, and hence, it is quite difficult to find such a light.

Furthermore, since a frequency band of a light used in optical communication is quite different from the same of an electromagnetic wave used in electromagnetic communication, jamming effective to an electromagnetic wave cannot interfere with optical communication.

The first drone 100 makes vertical communication with the GPS satellite 310, and accordingly, the signal-receiving unit 110 receives the signal 311 (for instance, a laser pulse signal) from the GPS satellite 310 located above the first drone 100. Consequently, it is necessary to transmit a laser pulse having a high intensity above the first drone 100 in order to jam the communication to be made between the first drone 100 and the GPS satellite 310, however, such transmission of a laser pulse is quite difficult or almost impossible to carry out.

The communication system in accordance with the first exemplary embodiment is not to be limited to the above-mentioned structure, but it should be noted that the structure may be variously modified.

As illustrated in FIG. 1, though the display panel 130 is equipped on a body of the first drone 100 so as to face the right when viewed from the front in a direction in which the first drone 100 flies, the display panel 130 may be equipped anywhere on a body of the first drone 100. The display panel 130 may be equipped on a body of the first drone 100 so as to face upward, downward, forward, rearward, left or right.

The display panel 130 radially emits a light within about 70 degrees from a vertical central line of itself. Though the second drone 200 is supposed in the first exemplary embodiment to fly at the right side of the first drone 100, the second drone 200 may fly anywhere within an area in which a light is radially emitted from the display panel 130.

There are various types for driving a drone. For instance, a drone may be driven by propellers or a drone may be driven as a rocket or a missile. The communication system in accordance with the first exemplary embodiment is applicable to any type of drones.

The above-mentioned first exemplary embodiment is an example in which the communication system is applied to drones. It should be noted that the communication system is applicable to not only an unmanned flying object such as a drone, but alto a manned flying object such as a helicopter.

Furthermore, the communication system may be applied to objects moving on ground, objects moving on water, and objects moving in water (as long as a light can reach there), as well as objects flying in the air.

Of course, the communication system is applicable not only between objects of the same kind as mentioned above, but also between objects of different kinds such as between a flying object and an object moving on ground, between a flying object and an object moving on water, and between an object moving on water and an object moving in water.

In the first exemplary embodiment, the first drone 100 is designed to transmit an optical signal indicative of a position coordinate of the first drone 100 to the second drone 200. Information to be transmitted to the second drone 200 from the first drone 100 is not to be limited to a position coordinate of the first drone 100. Other information (for instance, instructions from a base station, weather information, and so on) may be transmitted to the second drone 200 in place of or together with a position coordinate of the first drone 100.

In the first exemplary embodiment, a position coordinate of the first drone 100 is obtained from the GPS satellite 310. Other low-orbit satellites (satellites flying at an attitude of 2000 km or smaller from an earth) may be employed in place of the GPS satellite 310.

The first drone 100 may be designed to receive a signal indicative of a position coordinate thereof from other satellites together with the GPS satellite 310. By receiving a plurality of the signals 311 from a plurality of satellites, it is possible to amend a position coordinate of the first drone 100 based on a difference among the signals 311.

As mentioned earlier, the signal-receiving unit 110 can transmit a signal to the GPS satellite 310. For instance, the signal-receiving unit 110 transmits an optical pulse signal to the GPS satellite 310 or other low-orbit satellites, and then, the GPS satellite 310 or other low-orbit satellites photographs the thus received optical pulse signal, resulting in that the GPS satellite 310 or other low-orbit satellites can obtain a position coordinate of the first drone 100. The GPS satellite 310 or other low-orbit satellites transmits the thus obtained position coordinate to the first drone 100, ensuring that the first drone 100 can have a position coordinate thereof having been calculated by the GPS satellite 310 or other low-orbit satellites and a position coordinate thereof having been calculated by itself, and hence, the first drone can amend a position coordinate based on a difference among those position coordinates. Thus, the first drone 100 can have a highly accurate position coordinate.

Second Exemplary Embodiment

The first exemplary embodiment suggested the communication system to be applied between the single first drone 100 and the single second drone 200, but a number of the second drone 200 is not to be limited to one. The communication system may be applied between the single first drone 100 and a plurality of the second drones 200.

The second exemplary embodiment explained hereinbelow suggests an example of a communication system to be applied between the single first drone 100 and a plurality of drones flying in the formation of a swarm, specifically, six second drones 200A to 200F.

Figure 4:
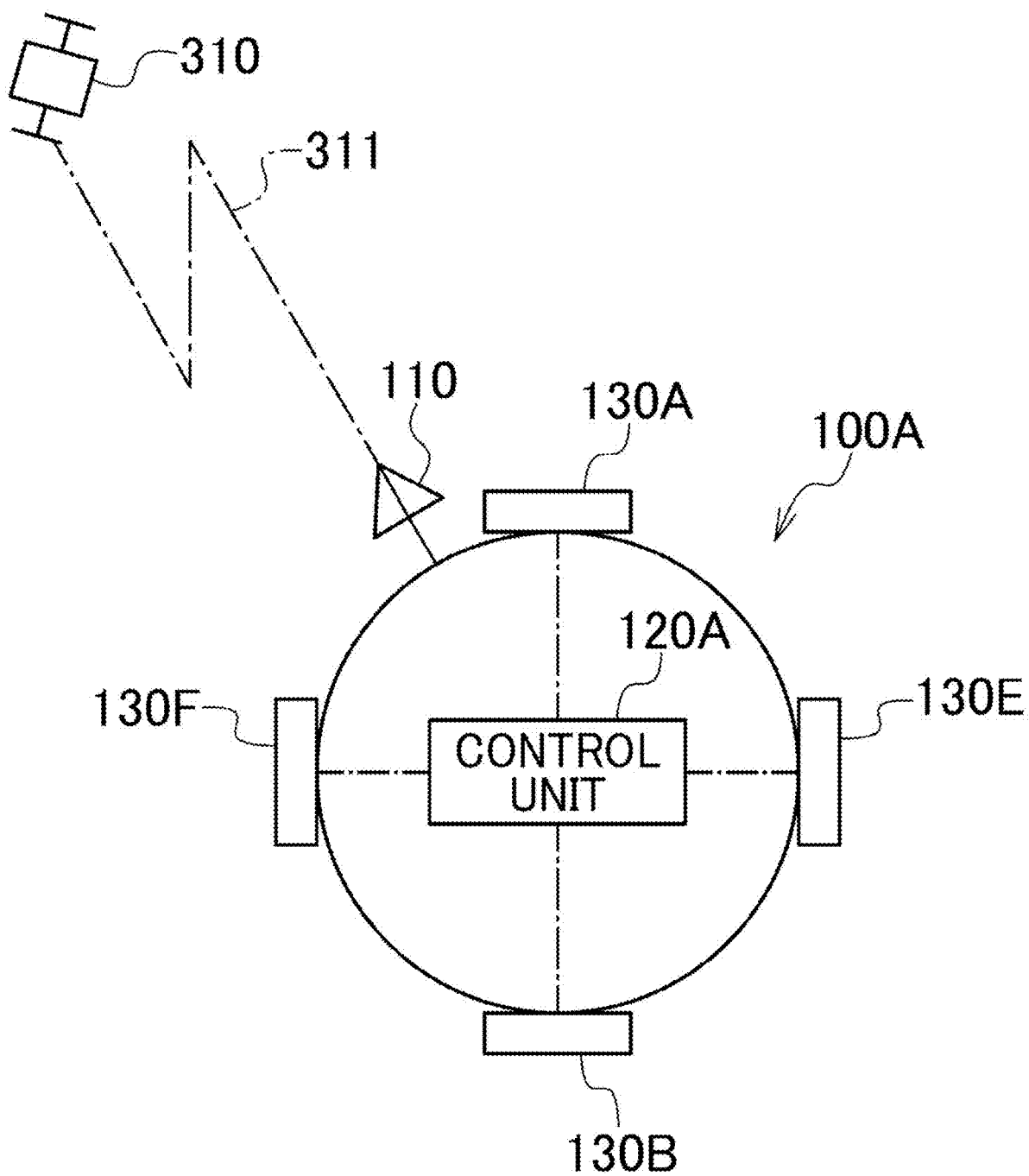
FIG. 4 is a longitudinal section drawing (viewed from a front) showing a structure of a first drone in the communication system in accordance with the second exemplary embodiment.

FIG. 4 is a longitudinal section drawing (viewed from a front) showing a structure of the first drone 100A in the communication system in accordance with the second exemplary embodiment.

The first drone 100 in the first exemplary embodiment is designed to include the single display panel 130. In contrast, the first drone 100A in the second exemplary embodiment is designed to include six display panels 130A to 130F. The first drone 100A is designed to have the same structure as that of the first drone 100 except a number of the display panels.

The display panels 130A and 130B are equipped on a body of the first drone 100A so as to face upward and downward, the display panels 130C and 130D (neither illustrated in FIG. 4) are equipped on a body of the first drone 100A so as to face front and rear, and the display panels 130E and 130F are equipped on a body of the first drone 100A so as to face left and right in a direction in which the first drone 100A flies.

Figure 5:
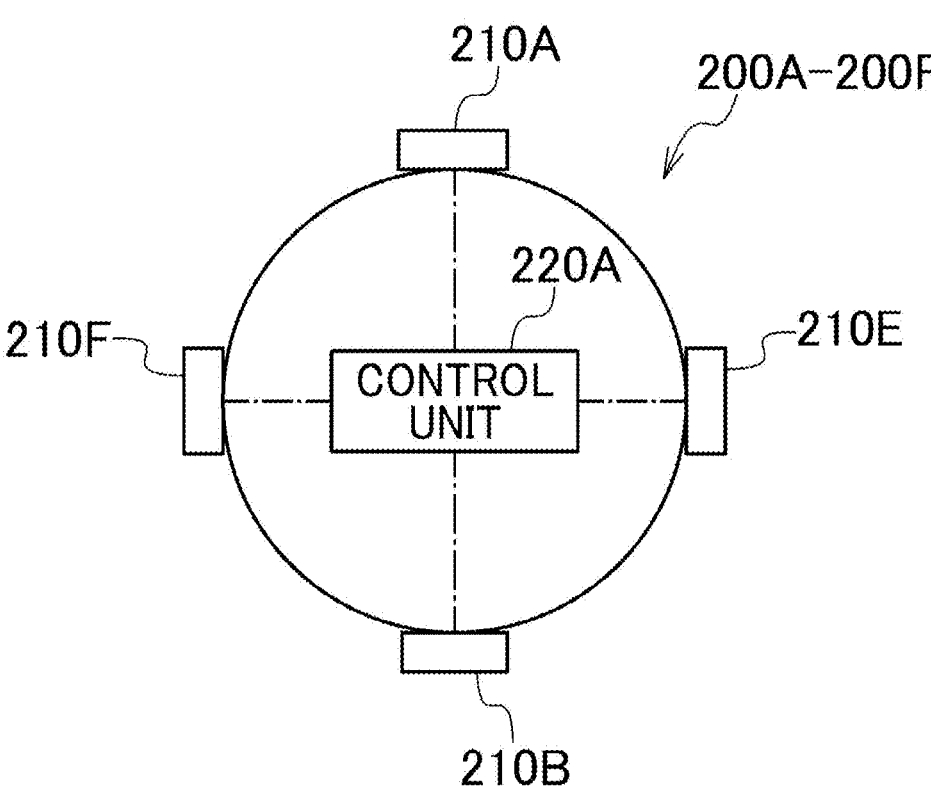
FIG. 5 is a longitudinal section drawing (viewed from a front) showing a structure of a second drone in the communication system in accordance with second exemplary embodiment.

FIG. 5 is a longitudinal section drawing (viewed from a front) showing a structure of the second drones 200A to 200F. The second drones 200A to 200F are designed to have a structure identical with one another.

Whereas the second drone 200 in the first exemplary embodiment is designed to include the single image pickup unit 210, each of the second drones 200A to 200F in the second exemplary embodiment is designed to include six image pickup units 210A to 210F. Each of the second drones 200A to 200F is designed to have the same structure as that of the second drone 200 except a number of the image pickup units.

The image pickup units 210A and 210B are equipped on a body of each of the second drones 200A to 200F so as to face upward and downward, the image pickup units 210C and 210D (neither illustrated in FIG. 5) are equipped on a body of each of the second drones 200A to 200F so as to face forward and rearward, and the image pickup units 210E and 210F are equipped on a body of each of the second drones 200A to 200F so as to face left and right all in a direction in which each of the second drones 200A to 200F flies.

Figure 6:
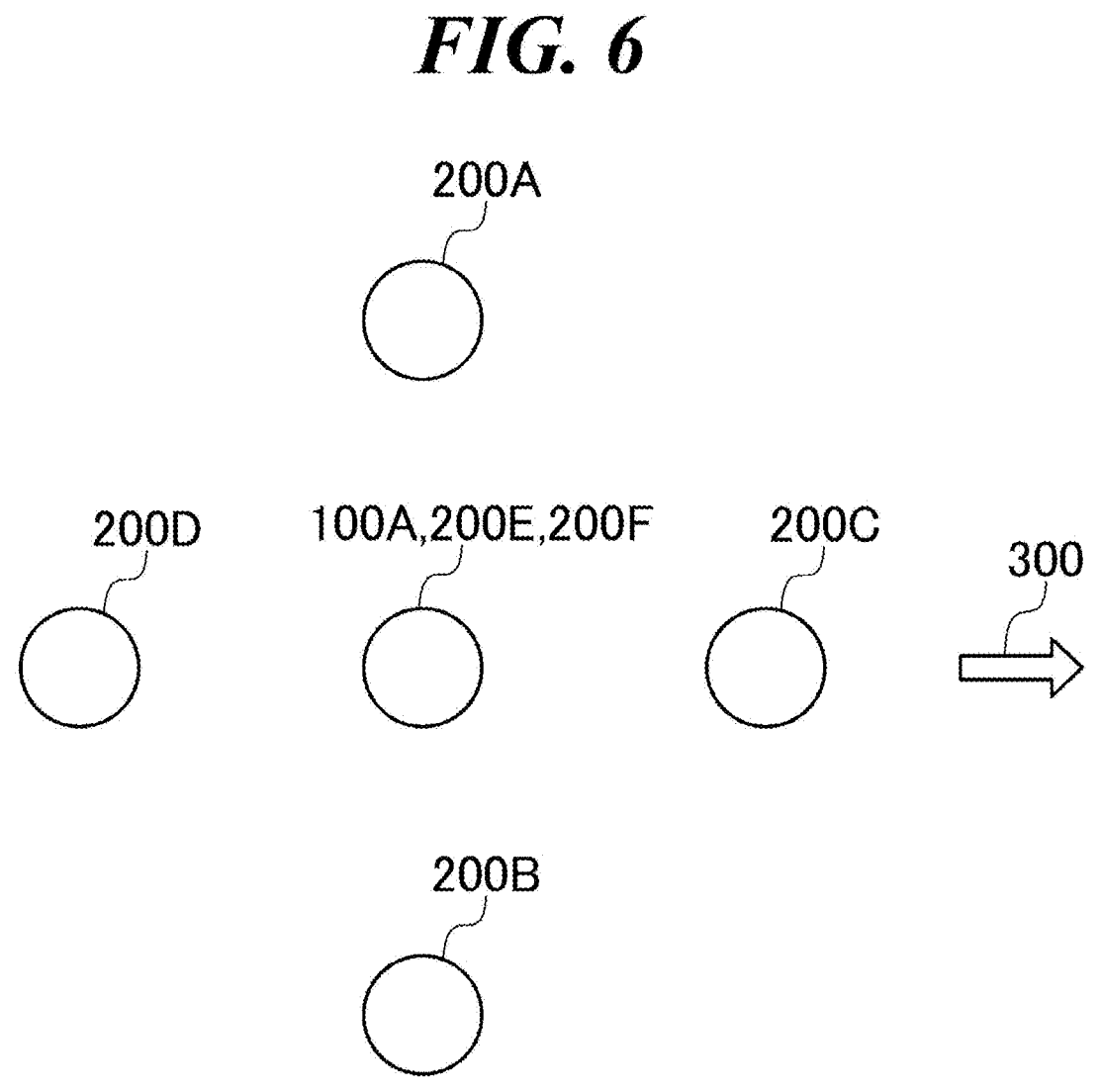
Figure 7:
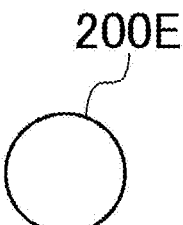
FIG. 7 illustrates a positional relation among drones in a swarm in the communication system in accordance with second exemplary embodiment.
Figure 7:
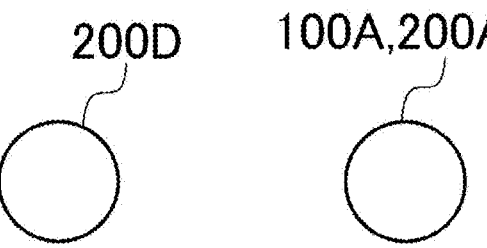
Figure 7:
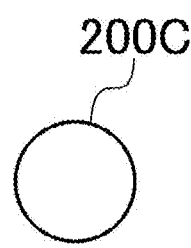
Figure 7:
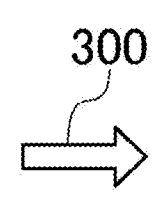

FIGS. 6 and 7 illustrate a positional relation among the second drones 200A to 200F flying in the formation of a swarm. FIG. 6 illustrates a positional relation viewed from left, and FIG. 7 illustrates a positional relation viewed from upward.

As illustrated in FIGS. 6 and 7, the seven drones 100A and 200A to 200F flying in a swarm are supposed to fly to the right in FIGS. 6 and 7 at the same speed as shown with an arrow 300.

The six drones 200A to 200F fly around the first drone 100A so that the first drone 100A is centrally located. Specifically, as illustrated in FIG. 6, the second drones 200A and 200B are located upward and downward relative to the first drone 100A, and the second drones 2000 and 200D are located forward and rearward relative to the first drone 100A. As illustrated in FIG. 7, the second drones 200E and 200F are located at the left and right relative to the first drone 100A.

Thus, the six display panels 130A to 130F of the first drone 100A face the image pickle units 210A to 210F of the six second drones 200A to 200F, respectively.

The communication system in accordance with the second exemplary embodiment includes the signal-receiving unit 110, the control unit 120 and the display panels 130A to 130F of the first drone 100A as a signal transmitter, and further includes the image pickup units 210A and 210F and the control units 220 of the second drones 200A to 200F as signal receivers.

An operation of the communication system in accordance with the second exemplary embodiment is identical with the same of the communication system in accordance with the first exemplary embodiment (see FIG. 3). In the second exemplary embodiment, the first drone 100A emits a light in a pattern indicative of a position coordinate of the first drone 100A through the display panels 130A to 130F, and the image pickup units 210A to 210F of the second drones 200A to 200F photograph the light pattern.

The communication system in accordance with the second exemplary embodiment provides the same advantages as those provided by the first exemplary embodiment, to the second drones 200A to 200F.

The communication system in accordance with the second exemplary embodiment is not to be limited to the above-mentioned structure, but it should be noted that the structure may be variously modified.

As mentioned above, since each of the display panels 130A to 130F radially emits a light within about 70 degrees from a vertical central line of itself, it is possible to transmit a light of a position coordinate pattern to a plurality of the second drones from the signal display panel by causing the second drones to fly within an area in which the light of a position coordinate pattern is radially emitted from the display panel, ensuring that the single display panel is able to cover a plurality of the second drones. Accordingly, a number of the second drones flying around the single first drone 100A is not to be limited to six, but any number (tens, hundreds or greater) can be selected.

In addition, in the case that a swarm includes a lot (hundreds, thousands or greater) of drones, a plurality of the first drones 100A may be employed, in which case, a plurality of the second drones may fly around each of the first drones 100A.

Since the first drone 100 and the second drone 200 in the first exemplary embodiment are designed to include the single display panel 130 and the single image pickup unit 210, respectively, it is necessary for the first drone 100 and the second drone 200 to fly such that the display panel 130 and the image pickup unit 210 face each other. In contrast, since the first drone 100A and the second drones 200A to 200F in the second exemplary embodiment are designed to include the six display panels 130A to 130F and the six image pickup units 210A to 210F, respectively, the second drones 200A to 200F may fly upward, downward, frontward, rearward, at left or right relative to the first drone 100A.

Third Exemplary Embodiment

Though one-way optical communication is made from the first drones 100 and 100A to the second drones 200 and 200A to 200F in the above-mentioned first and second exemplary embodiment, interactive communication can be made between the first and second drones. In the communication system in accordance with the third exemplary embodiment described hereinbelow, reply is made to the first drone from the second drone, as well as transmission to the second drone from the first drone.

Figure 8:
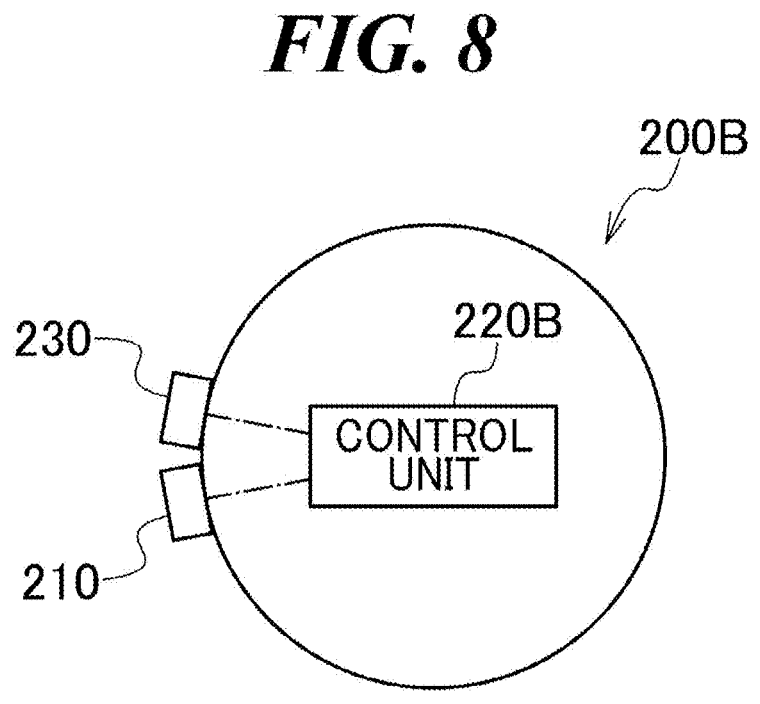

FIG. 8 is a longitudinal section drawing (viewed from a front) showing a structure of a second drone 200B to be employed in the communication system in accordance with third exemplary embodiment.

In comparison with the second drone 200 (see FIG. 2) used in the first exemplary embodiment, the second drone 200B is designed to additionally include a display panel 230 as a display unit.

The second drone 200B includes a control unit 220B deciphering a position coordinate of the second drone 200B based on a position coordinate pattern having been received from a first drone 100B (see FIG. 9), making a position coordinate pattern indicative of a position of the second drone 200B, and displaying the thus made position coordinate pattern in the display panel 230 in the form of an optical signal.

Figure 9:
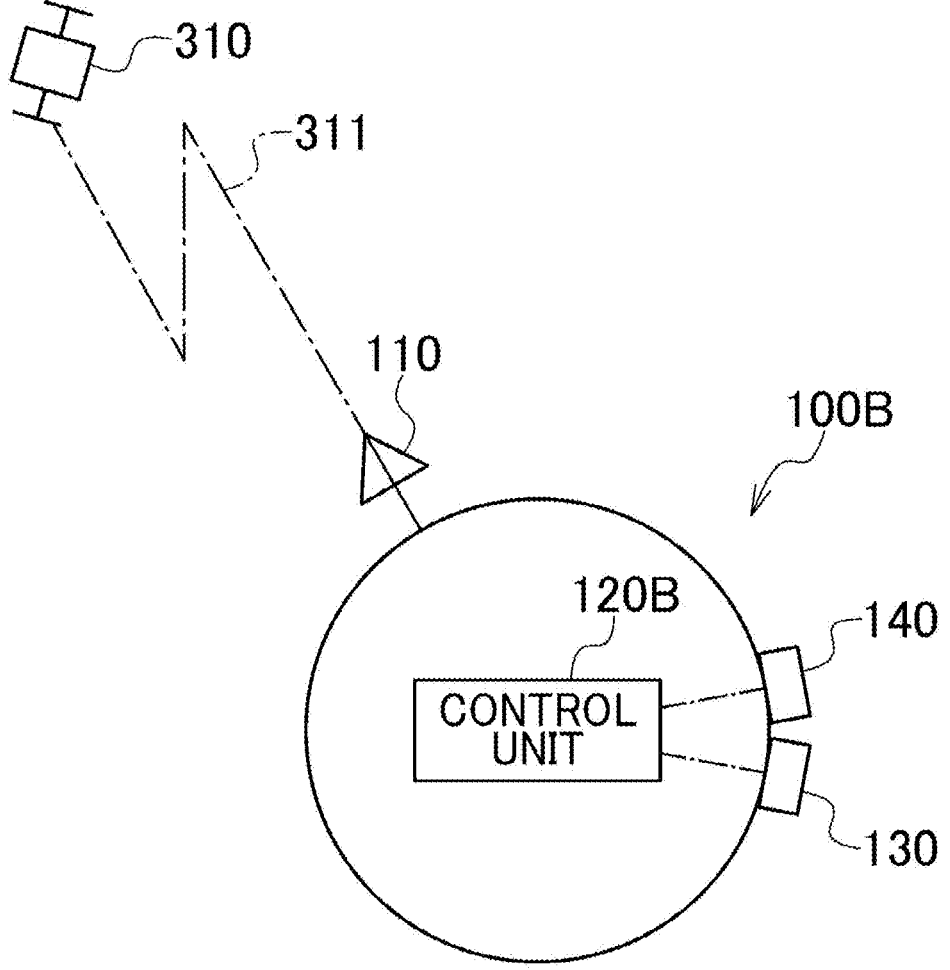
FIG. 9 is a longitudinal section drawing (viewed from a front) showing a structure of a first drone in the communication system in accordance with third exemplary embodiment.

FIG. 9 is a longitudinal section drawing (viewed from a front) showing a structure of the first drone 100B.

In comparison with the first drone 100 (see FIG. 1) used in the first exemplary embodiment, the first drone 100B is designed to additionally include an image pickup unit 140. The image pickup unit 140 photographs a position coordinate pattern of the second drone 200B emitted from the display panel 230 of the second drone 200B.

The first drone 100B includes a control unit 120B deciphering a position coordinate pattern having been photographed by the image pickup unit 140 to thereby obtain a position coordinate of the second drone 200B.

As mentioned above, by designing the second drone 200B to be able to make communication with the first drone 100B, the first drone 100B can grasp a position of the second drone 200B, and use the thus grasped position as information for preventing contact and/or collision with each other.

It is possible to apply the communication system in accordance with the third exemplary embodiment to the second exemplary embodiment to thereby make interactive communication between the first drone 100B and a plurality of the second drones 200B.

In addition, as well as interactive communication between the first drone 100B and the second drones 200B, it is possible for a plurality of the second drones to make interactive communication among themselves, in which case, the image pickup unit 210 of a certain second drone 200B photographs a position coordinate pattern(s) having been emitted from other second drone(s) 200B, and the control unit 220B deciphers or decodes the thus photographed position coordinate pattern(s) to thereby identify a position coordinate(s) of the other second drone(s).

By swapping position coordinates among a plurality of the second drones, each of the second drones can amend a position coordinate of itself for enhancing an accuracy of the position coordinate of itself.

In particular, the second drone 200B can accurately determine a position coordinate of itself by swapping position coordinate patterns with at least three other second drones 200B. Consequently, it is preferable for the first drone 100B to set a quantity of a light (a light intensity) to be emitted from the display panel 130 such that a position coordinate pattern of itself can be transmitted to at least three nearby second drones 200B.

As mentioned above, in a swarm including hundreds or thousands of drones, a plurality (about three or four) of the first drones make long-distance communication with a low-orbit satellite such as the GPS satellite 310 to thereby obtain an absolute position coordinate, and further, a short-distance communication is made for transmitting/receiving a relative position coordinate between the first drone and the second drone or among a plurality of the second drones. Thus, each of the drones can accurately grasp a position coordinate of itself to thereby be able to prevent contact and/or collision with other drones.

Fourth Exemplary Embodiment

In the communication systems in accordance with the above-mentioned first to third exemplary embodiments, the display panels 130, 130A to 130F and 230 and the image pickup units 210, 210A to 210F and 140 are all fixed on a body of the first or second drone, and hence, the display panels and the image pickup units face in a fixed direction.

In contrast, the display panels 130, 130A to 130F and 230 and the image pickup units 210, 210A to 210F and 140 may be equipped movably on a body of the first or second drone to thereby allow the display panels and the image pickup units to face in any direction.

Figure 10:
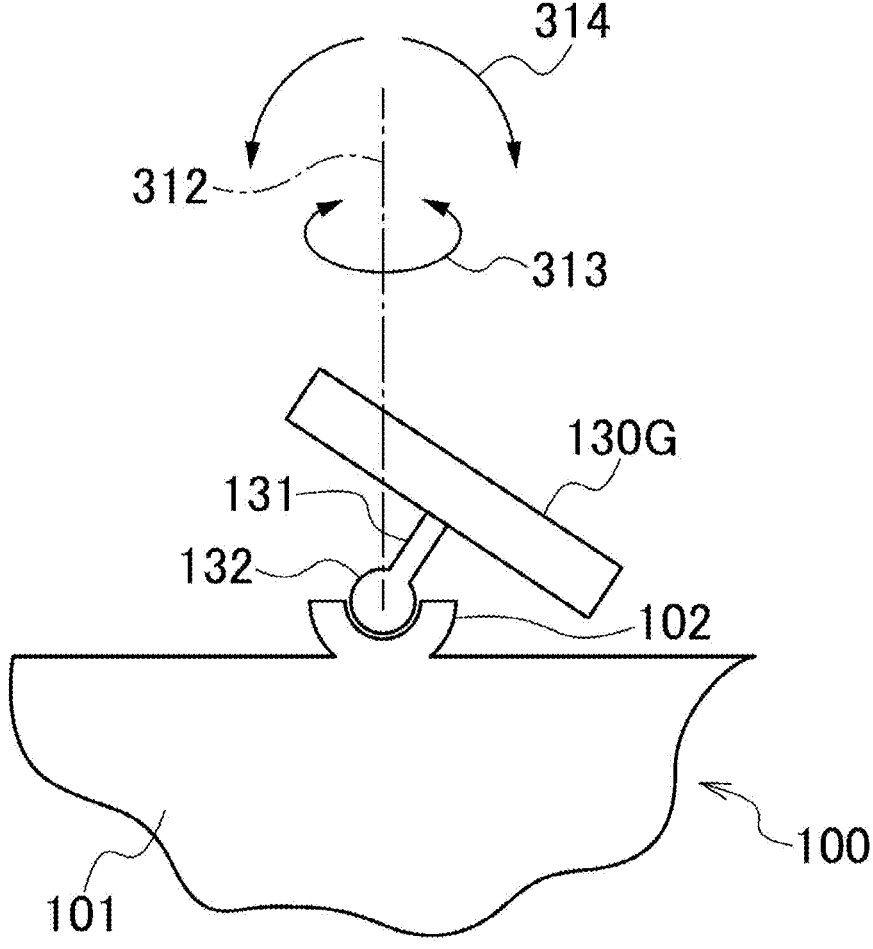
FIG. 10 is a longitudinal section drawing illustrating a first example of a display panel movably equipped on a body of a first drone in the communication system in accordance with fourth exemplary embodiment.

FIG. 10 is a longitudinal section drawing illustrating a first example of a display panel 130G movably equipped on a body 101 of the first drone 100.

A shaft 131 is fixed on a rear of the display panel 130G so as to perpendicularly extend from a rear of the display panel 130G. The shaft 130 has a spherical tip 132.

A support 102 formed with a semispherical recess is formed on the body 101 of the first drone 100. The spherical tip 132 is fit into the semispherical recess of the support 102.

A driver (not illustrated) is connected with the display panel 130G or the shaft 131. This driver is controlled in operation by the control unit 120 (see FIG. 1).

The control unit 120 can rotate or pivot the display panel 130G through the driver. For instance, as shown with an arrow 313, the display panel 130G can be rotated around an axis 312 perpendicularly extending from the body 101 with the display panel 130G being in an inclined condition. As an alternative, as shown with an arrow 314, the display panel 130G can be pivoted around the axis 312 in a vertical plane.

Figure 11:
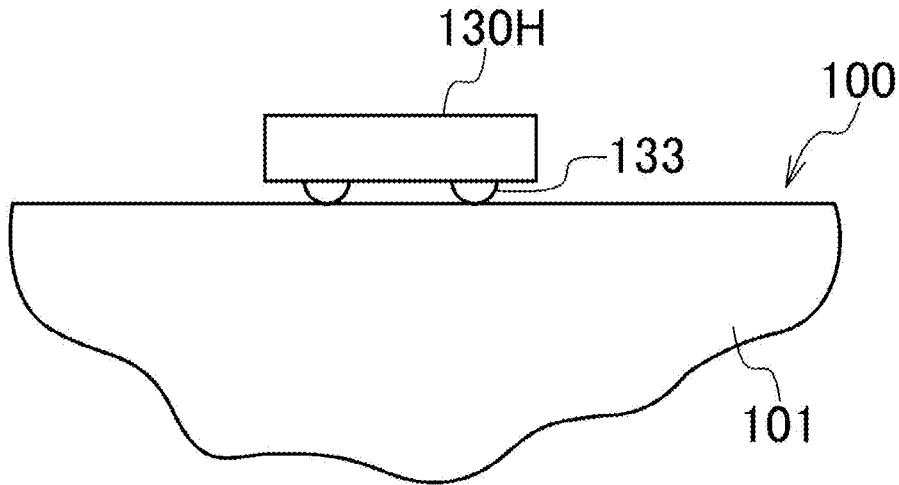
FIG. 11 is a longitudinal section drawing illustrating a second example of a display panel movably equipped on a body of a first drone in the communication system in accordance with fourth exemplary embodiment.

FIG. 11 is a longitudinal section drawing illustrating a second example of a display panel 130H movably equipped on the body 101 of the first drone 100.

As illustrated in FIG. 11, the display panel 130H is quipped at a rear thereof with a plurality of wheels 133. Each of the wheels 133 is designed to be able to run on a rail (not illustrated) formed on the body 101 of the first drone 100 or run in a groove or recess formed in the body 101 of the first drone 100.

A driver (not illustrated) is connected with the wheels 133. This driver is controlled in operation by the control unit 120 (see FIG. 1).

Thus, the display panel 130H can run or move on the body 101 of the first drone 100. For instance, the display panel 130H can run forwardly or rearwardly of the first drone 100 or run (or move) around the body 101 at any angle (360 degrees in maximum).

As mentioned above, the first drone 100 can accurately transmit a position coordinate pattern to a neighboring second drone by movably equipping the display panels 130G and 130H on the body 101 of the first drone 100. Furthermore, by rotating or pivoting the display panel 130G, or by causing the display panel 130H to move, it is possible to increase a number of the second drones flying around the first drone 100 to which the first drone 100 can transmit a position coordinate pattern thereof.

A combination of the wheels 133 and the rail (or the groove/recess) is just an example for causing the display panel 130H to move. Other combinations or mechanisms may be selected.

As well as the display panel of the first drone 100, the image pickup unit 140 (see FIG. 9) of the first drone, the image pickup units 210 (see FIG. 2), and 210A to 210F of the second drone, and the display panel 230 of the second drone may be designed movable like the display panels 130G and 130H.

Fifth Exemplary Embodiment

Even if the first drone 100 transmits a position coordinate pattern to the second drone 200 through the display panel 130, the second drone 200 may not receive an optical signal indicative of the position coordinate pattern for some reasons. For instance, the second drone 200 is not located within an area in which an optical signal transmitted from the first drone 100 cannot reach, or bad weathers such as dense fog and heavy rain prevents an optical signal transmitted from the first drone 100 from reaching the second drone 200. The fifth exemplary embodiment is suggested for such cases where an optical signal transmitted from the first drone 100 cannot reach the second drone 200.

In the fifth exemplary embodiment, the control unit 220 of the second drone 200 is designed to, when the image pickup unit 210 has photographed a position coordinate pattern transmitted from the first drone 100 through the display panel 130, transmit a confirmation signal as a reply, indicating that the second drone 200 has received the position coordinate pattern, to the first drone 100.

Figure 12:
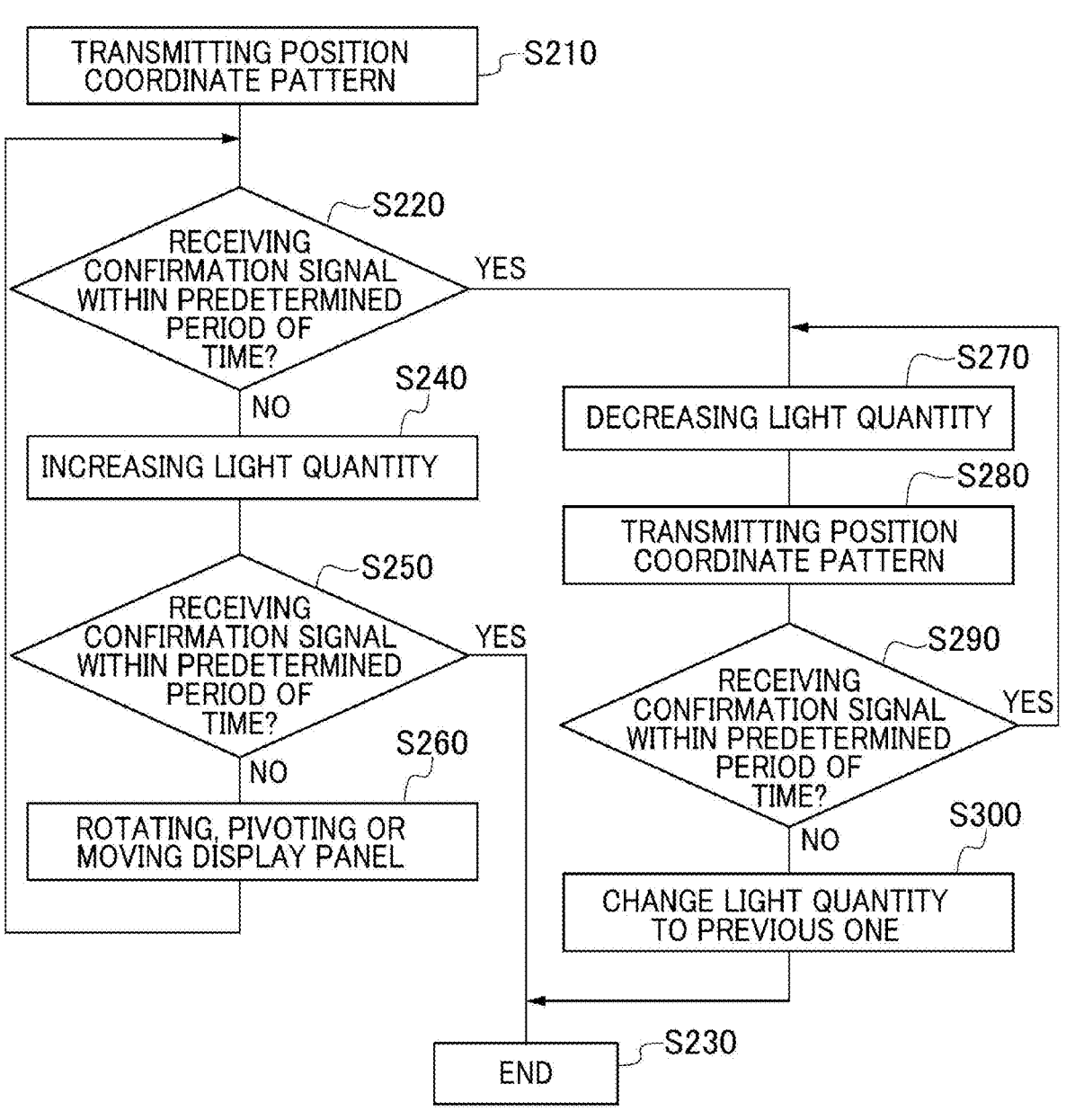
FIG. 12 is a flowchart showing actions to be carried out in the communication system in accordance with the fifth exemplary embodiment.

FIG. 12 is a flowchart showing actions to be carried out in the communication system in accordance with the fifth exemplary embodiment. Hereinbelow is explained an operation of the communication system in accordance with the fifth exemplary embodiment.

The first drone 100 transmits an optical signal indicative of a position coordinate pattern thereof to the second drone 200 through the display panel 130 (step S210).

Then, the control unit 120 of the first drone 100 judges whether the confirmation signal was received from the second drone 200 within a predetermined period of time (for instance, 5 seconds), that is, whether the image pickup unit 140 (see FIG. 9) photographed the confirmation signal having been transmitted from the second drone 200 (step S220).

If the first drone 100 did not receive the confirmation signal from the second drone 200 within a predetermined period of time (NO in step S220), the control unit 120 judges that a position coordinate pattern did not reach the second drone 200, and thus, increases a quantity of a light to be emitted from the display panel 130 (step S240).

Thereafter, the control unit 120 of the first drone 100 judges again whether the confirmation signal was received from the second drone 200 within a predetermined period of time (step S250).

If the first drone 100 received the confirmation signal from the second drone 200 within a predetermined period of time (YES in step S220), the control unit 120 judges that a position coordinate pattern reached the second drone 200, and thus, an action for confirming receipt of a position coordinate pattern is finished (step S230).

If the first drone 100 did not receive the confirmation signal from the second drone 200 within a predetermined period of time (NO in step S250), the control unit 120 judges that a position coordinate pattern did not reach the second drone 200, and thus, causes the display panel 130 to rotate/pivot (see FIG. 10) or move (see FIG. 11) (step S260).

For instance, rotation or pivotal motion of the display panel 130 is carried out by a predetermined angle (for instance, 10 degrees), and movement of the display panel 130 is carried out by a predetermined distance (for instance, 50 centimeters).

Then, steps S220 to S260 are repeatedly carried out until the first drone 100 receives the confirmation signal from the second drone 200.

The communication system in accordance with the fifth exemplary embodiment makes it possible to maximize a probability at which a position coordinate pattern is transmitted to the second drone 200 from the first drone 100.

Even if the first drone 100 receives the confirmation signal from the second drone 200 within a predetermined period of time (YES in step S220), there is no problem in the signal transmission/reception between the first drone 100 and the second drone 200, but it is not clear whether the display panel 130 transmits an optimal quantity of an optical signal. In other words, the display panel 130 may transmit an optical signal in a too much quantity. Thus, a control for optimizing a quantity of a light to be emitted from the display panel 130 is carried out as follows.

If the first drone 100 receives the confirmation signal from the second drone 200 within a predetermined period of time (YES in step S220), the control unit 120 of the first drone 100 decreases a quantity (or an intensity) of a light by a predetermined quantity (step S270).

Thereafter, the first drone 100 transmits again a position coordinate pattern in the form of an optical signal to the second drone 200 through the display panel 130 (step S280).

Then, the control unit 120 of the first drone 100 judges again whether the confirmation signal was received from the second drone 200 within a predetermined period of time, that is, whether the image pickup unit 140 (see FIG. 9) photographed the confirmation signal having been transmitted from the second drone 200 (step S290).

If the first drone 100 received the confirmation signal from the second drone 200 within a predetermined period of time (YES in step S290), steps S270 to S290 are repeatedly carried out until the first drone 100 does not receive the confirmation signal from the second drone 200 within a predetermined period of time.

If the first drone 100 did not receive the confirmation signal from the second drone 200 within a predetermined period of time (NO in step S290), the control unit 120 sets a quantity of a light to be emitted from the display panel 130 back to a previous quantity (a quantity at which the position coordinate pattern reached the second drone 200). That is, the control unit 120 increases a quantity of a light by one step (step S300). A light-quantity control is thus finished (step S230).

By carrying out the above-mentioned light-quantity control, it is possible to determine a minimum quantity of a light for transmitting the position coordinate pattern without unnecessarily increasing a quantity of a light to be emitted from the display panel 130, ensuring reduction in consumption of electric power.

The above-mentioned light-quantity control can be carried out in a smaller degree in order to further reduce electric-power consumption.

Figure 13:
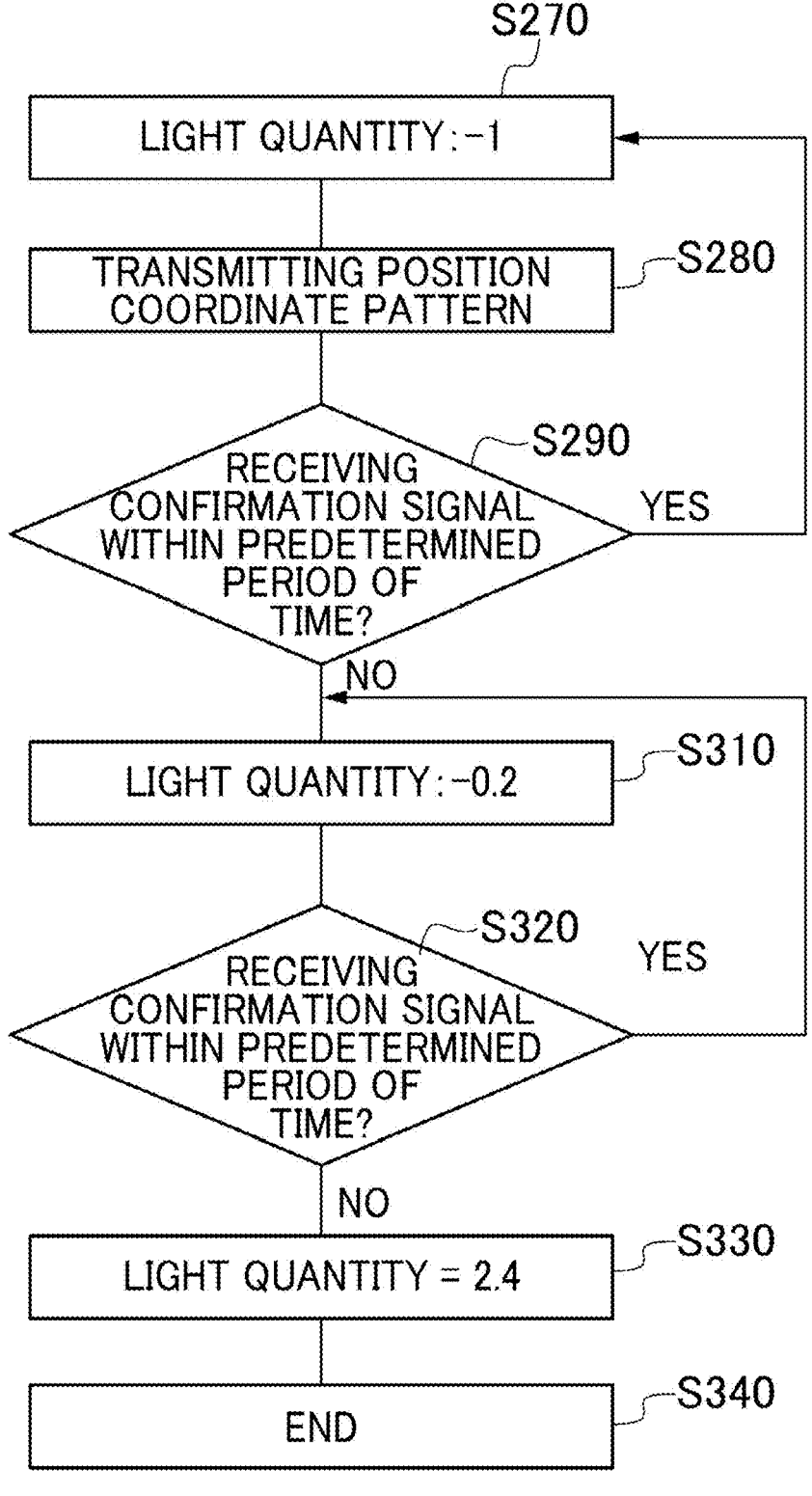
FIG. 13 is a flowchart showing actions to be carried out in a control of a quantity of light transmitted from a display panel in the communication system in accordance with the fifth exemplary embodiment.

FIG. 13 is a flowchart showing actions to be carried out in the light-quantity control.

For instance, it is supposed that the control unit 120 sets a light-quantity to be at level 5 and the display panel 130 transmits a position coordinate pattern at level 5 (step S210 in FIG. 12), and then, the first drone 100 receives the confirmation signal within a predetermined period of time (YES in step S220 in FIG. 12).

The control unit 120 sets a light-quantity level of the display panel 130 to lower one by one. Thus, the control unit 120 lowers a light-quantity level of the display panel 130 to level 4 (step S270).

Then, the first drone 100 transmits again a position coordinate pattern at light-quantity level 4 to the second drone 200 through the display panel 130 (step S280).

Then, the control unit 120 of the first drone 100 judges again whether the first drone 100 received the confirmation signal from the second drone 200 within a predetermined period of time, that is, whether the image pickup unit 140 (see FIG. 9) photographed the confirmation signal having been transmitted from the second drone 200 (step S290).

If the first drone 100 received the confirmation signal from the second drone 200 within a predetermined period of time (YES in step S290), the control unit 120 lowers a light-quantity level of the display panel 130 to level 3 (step S270).

Then, steps S280 and S290 are carried out again.

It is supposed that the first drone 100 did not receive the confirmation signal from the second drone 200 within a predetermined period of time, when a light-quantity level of the display panel 130 is set at level 3 (NO in step S290).

The control unit 120 is designed to lower a light-quantity level of the display panel 130 by 0.2, if the first drone 100 did not receive the confirmation signal from the second drone 200 within a predetermined period of time. Thus, the control unit 120 lowers a light-quantity level of the display panel 130 to 2.8 from 3 (step S310).

Then, the first drone 100 transmits again a position coordinate pattern at light-quantity level 2.8 to the second drone 200 through the display panel 130, and the control unit 120 of the first drone 100 judges again whether the first drone 100 received the confirmation signal from the second drone 200 within a predetermined period of time, that is, whether the image pickup unit 140 (see FIG. 9) photographed the confirmation signal having been transmitted from the second drone 200 (step S320).

If the first drone 100 received the confirmation signal from the second drone 200 within a predetermined period of time (YES in step S320), the control unit 120 lowers a light-quantity level of the display panel 130 by 0.2 (step S310). Thus, a light-quantity level of the display panel 130 is now at 2.6.

It is supposed that steps S310 and S320 are carried out once or more, and the first drone 100 did not receive the confirmation signal from the second drone 200 within a predetermined period of time, when a light-quantity level of the display panel 130 is 2.2 (NO in step S320).

The control unit 120 raises a light-quantity level of the display panel 130 by one step, specifically, raises up to 2.4 from 2.2 (step S330). Thus, the light-quantity control is finished (step S340).

It is possible to further reduce electric-power consumption by carrying out a light-quantity control in a smaller degree as mentioned above.

A range by which a light-quantity level of the display panel 130 is lowered is not to be limited to 1 and 0.2. Any range may be determined.

It is possible to reduce electric-power consumption by lengthening an interval at which a position coordinate pattern is transmitted in place of or together with carrying out the above-mentioned light-quantity control of the display panel 130.

Figure 14:
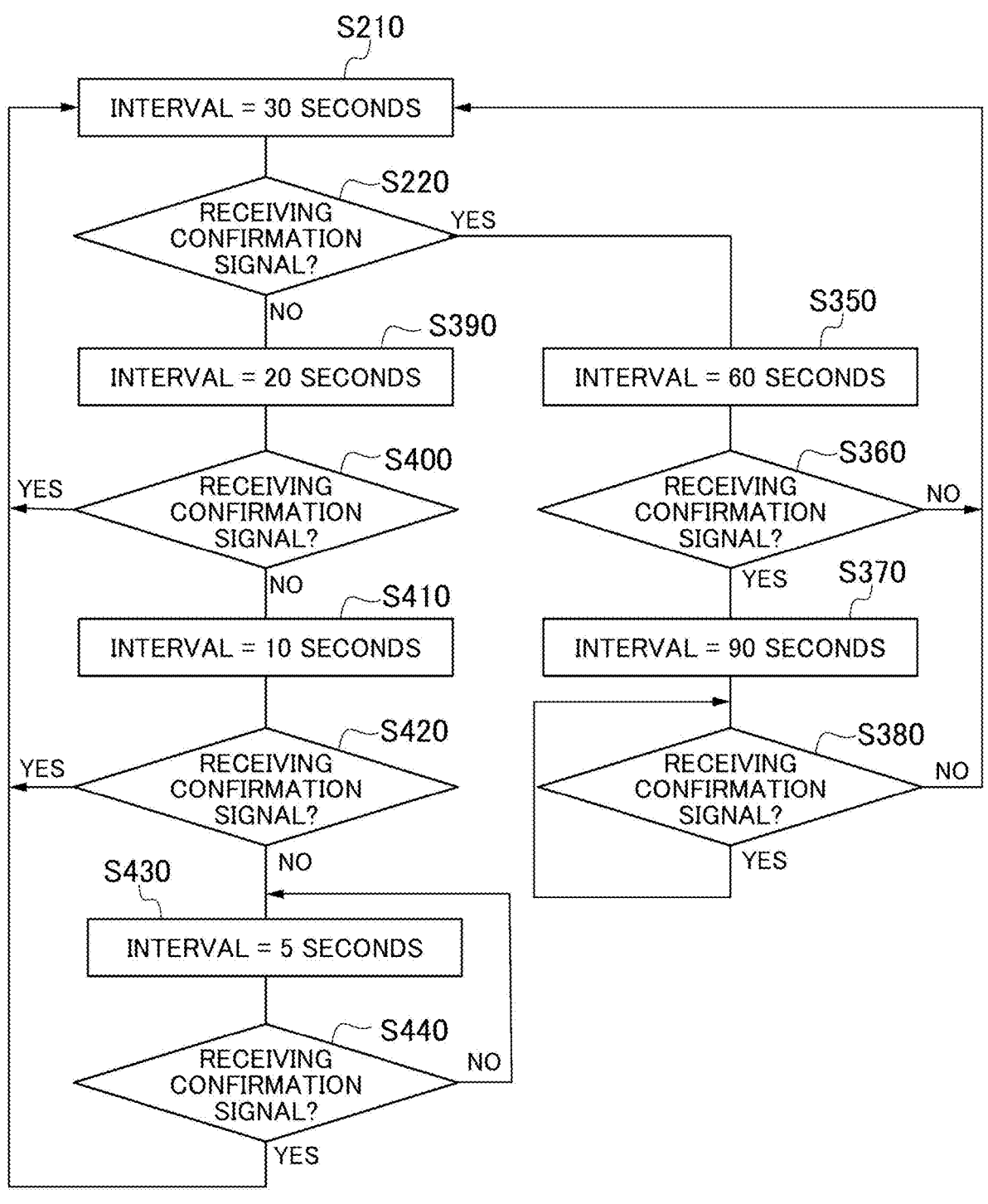
FIG. 14 is a flowchart showing actions to be carried out in a control of an interval at which a position coordinate pattern is transmitted in the communication system in accordance with the fifth exemplary embodiment.

FIG. 14 is a flowchart showing actions to be carried out in a control of an interval at which a position coordinate pattern is transmitted.

It is supposed that a position coordinate pattern is set to be transmitted at an interval of 30 seconds, for instance.

The control unit 120 transmits a position coordinate pattern in the form of an optical signal every 30 seconds to the second drone 200 through the display panel 130 (step S210).

Then, the control unit 120 of the first drone 100 judges whether the confirmation signal was received from the second drone 200 within a predetermined period of time, that is, whether the image pickup unit 140 (see FIG. 9) photographed the confirmation signal having been transmitted from the second drone 200 (step S220).

If the first drone 100 received the confirmation signal from the second drone 200 within a predetermined period of time (YES in step S220), the control unit 120 changes an interval at which a position coordinate pattern is transmitted to 60 seconds from 30 seconds (step S350), and optically transmits a position coordinate pattern every 60 seconds to the second drone 200 through the display panel 130.

Then, the control unit 120 of the first drone 100 judges whether the confirmation signal was received from the second drone 200 within a predetermined period of time, that is, whether the image pickup unit 140 (see FIG. 9) photographed the confirmation signal having been transmitted from the second drone 200 (step S360).

If the first drone 100 received the confirmation signal from the second drone 200 within a predetermined period of time (YES in step S360), the control unit 120 changes an interval at which a position coordinate pattern is transmitted to 90 seconds from 60 seconds (step S370), and optically transmits a position coordinate pattern every 90 seconds to the second drone 200 through the display panel 130.

Then, the control unit 120 of the first drone 100 judges whether the confirmation signal was received from the second drone 200 within a predetermined period of time, that is, whether the image pickup unit 140 (see FIG. 9) photographed the confirmation signal having been transmitted from the second drone 200 (step S380).

If the first drone 100 received the confirmation signal from the second drone 200 within a predetermined period of time (YES in step S380), the control unit 120 fixes the interval to be 90 seconds (step S370), and thereafter, optically transmits a position coordinate pattern at an interval of 90 seconds.

If the first drone 100 did not receive the confirmation signal from the second drone 200 within a predetermined period of time (NO in step S360, NO in step 380), the control unit 120 sets the interval back to 30 seconds from 60 or 90 seconds (step S210), and thereafter, optically transmits a position coordinate pattern at an interval of 30 seconds.

If the first drone 100 did not receive the confirmation signal from the second drone 200 within a predetermined period of time (NO in step S220), the control unit 120 changes (shortens) the interval to 20 seconds from 30 seconds (step S390), and thereafter, optically transmits a position coordinate pattern through the display panel 130 at an interval of 20 seconds.

Then, the control unit 120 of the first drone 100 judges whether the confirmation signal was received from the second drone 200 within a predetermined period of time, that is, whether the image pickup unit 140 (see FIG. 9) photographed the confirmation signal having been transmitted from the second drone 200 (step S400).

If the first drone 100 did not receive the confirmation signal from the second drone 200 within a predetermined period of time (NO in step S400), the control unit 120 changes (shortens) the interval to 10 seconds from 20 seconds (step S410), and thereafter, optically transmits a position coordinate pattern through the display panel 130 at an interval of 10 seconds.

Then, the control unit 120 of the first drone 100 judges whether the confirmation signal was received from the second drone 200 within a predetermined period of time, that is, whether the image pickup unit 140 (see FIG. 9) photographed the confirmation signal having been transmitted from the second drone 200 (step S420).

If the first drone 100 did not receive the confirmation signal from the second drone 200 within a predetermined period of time (NO in step S420), the control unit 120 changes (shortens) the interval to 5 seconds from 10 seconds (step S430), and thereafter, optically transmits a position coordinate pattern through the display panel 130 at an interval of 5 seconds.

Then, the control unit 120 of the first drone 100 judges whether the confirmation signal was received from the second drone 200 within a predetermined period of time, that is, whether the image pickup unit 140 (see FIG. 9) photographed the confirmation signal having been transmitted from the second drone 200 (step S440).

Even if the first drone 100 did not receive the confirmation signal from the second drone 200 within a predetermined period of time (NO in step S440), the control unit 120 fixes the interval to 5 seconds (step S430), and thereafter, optically transmits a position coordinate pattern through the display panel 130 at an interval of 5 seconds.

If the first drone 100 received the confirmation signal from the second drone 200 within a predetermined period of time (YES in step S400, YES in step S420), the control unit 120 changes the interval to 30 seconds from 20 or 10 seconds (step S210), and optically transmits a position coordinate pattern every 30 seconds to the second drone 200 through the display panel 130.

As mentioned above, it is possible to optimally adjust an interval at which a position coordinate pattern is transmitted to the second drone 200 from the first drone 100, in dependence on communication condition between the first drone 100 and the second drone 200. In particular, when communication condition between the first drone 100 and the second drone 200 is kept stable, it is possible to reduce electric-power consumption by lengthening the interval in comparison with a case in which no interval control is made.

The interval control is not to be limited to the above-mentioned one, but can be variously modified.

For instance, the interval may be changed to be longer or shorter by any degree in dependence on environment. When communication condition is good (for instance, fine weather), the interval may be changed longer by a degree greater than the above-mentioned one. As an alternative, when communication condition is not good (for instance, dense fog and heavy rain) or in an emergency (for instance, in the case that the first drone 100 flies at a high speed), the interval may be changed shorter by a degree smaller than the above-mentioned one.

The interval may be changed in dependence on whether the confirmation signal is received in response to a first transmission of a position coordinate pattern, for instance. For instance, when it is estimated that the second drone 200 is located too far away from the first drone 100, the interval may be immediately shortened without transmitting a second and later transmission(s) of a position coordinate pattern at an interval set in advance.

As an alternative, the interval may be changed in dependence on whether the first drone 100 receives the confirmation signal from the second drone 200 in response to the initial three transmissions of a position coordinate pattern. For instance, in the case that the second drone 200 is estimated to be close to a limit distance in which a position coordinate pattern optically transmitted from the first drone 100 is able to reach, a position coordinate pattern may be transmitted three times regardless of whether the confirmation signal is received in response to a first transmission of a position coordinate pattern to thereby be able to prevent the interval from being unnecessarily changed.

Sixth Exemplary Embodiment

As mentioned earlier, the communication system in accordance with the present invention can be applied to communication to be made among different kind of movers, as well as among the same kind of movers. As an example, hereinbelow is explained an embodiment in which the communication system is applied to communication between a swarm including first and second drones and a mover moving on ground (for instance, an automobile, a tank, a train and so on) as a third mover.

Figure 15:
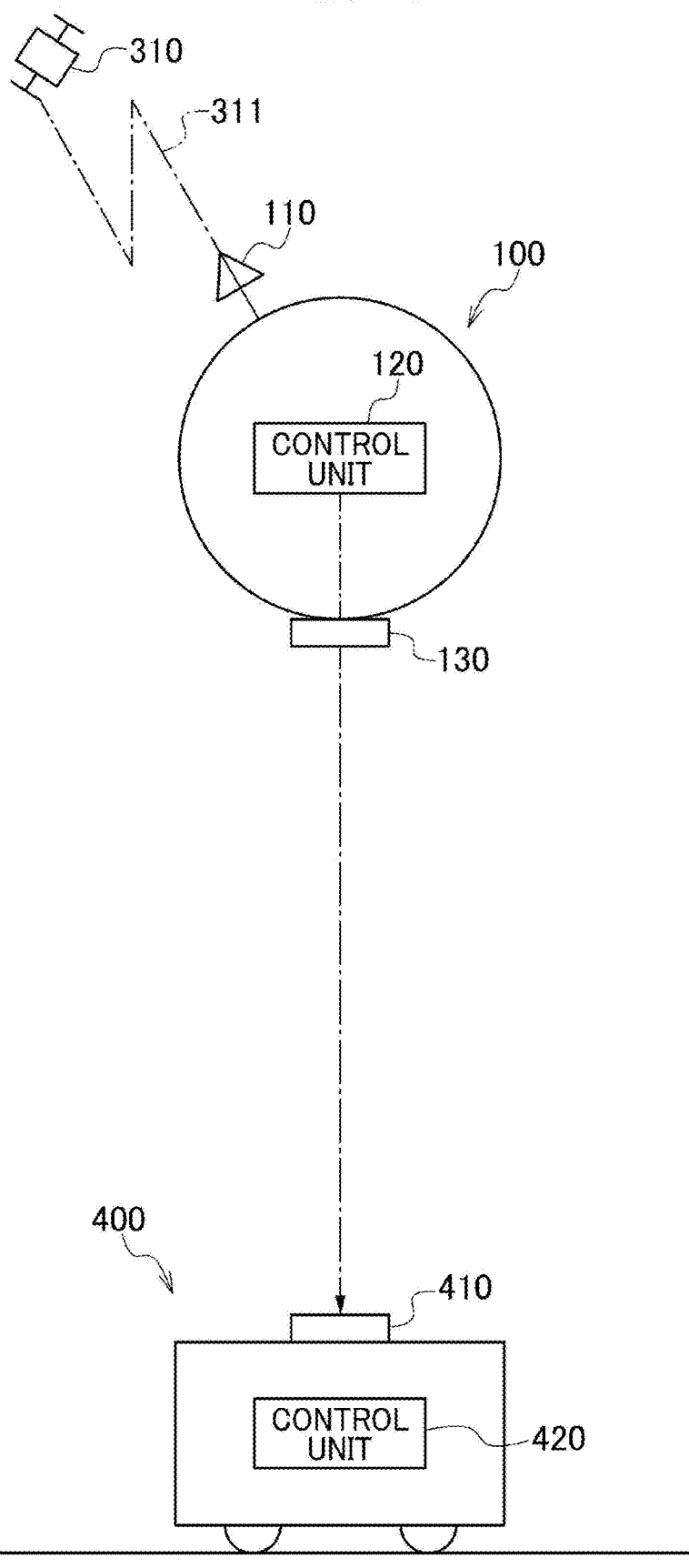
FIG. 15 is a schematic drawing of the communication system in accordance with the sixth exemplary embodiment.

FIG. 15 is a schematic drawing of the communication system in accordance with the sixth exemplary embodiment.

The communication system in accordance with the sixth exemplary embodiment is applied to communication to be made between the first drone 100 (see FIG. 1) and a mover 400 moving on ground.

The ground mover 400 includes an image pickup unit 410 photographing a position coordinate pattern displayed in the display panel 130 of the first drone 100, and a control unit 420 deciphering the position coordinate pattern having been photographed by the image pickup unit 410 and controlling a motion of the ground mover 400 in accordance with instructions included in the thus deciphered position coordinate pattern.

The ground mover 400 has the same structure as that of the second drone 200 (see FIG. 2) with respect to a communication, but since the communication system in accordance with the sixth exemplary embodiment relates to a communication to be made between a ground and a sky, the display panel 130 is equipped on a body the first drone 100 so as to face downwardly, and the image pickup unit 410 is equipped on the ground mover 400 so as to face upwardly.

The first drone 100 transmits a position coordinate pattern not only to the second drone 200, but also to the ground mover 400. Thus, the ground mover 400 is positionally controlled by the first drone 100 similarly to the second drone 200.

Communication to be made between the first drone 100 and the ground mover 400 is identical with communication to be made between the first drone 100 and the second drone 200. Consequently, the above-mentioned second to fifth exemplary embodiments can be applied to communication to be made between the first drone 100 and the ground mover 400.

The ground mover 400 is selected as the third mover in the sixth exemplary embodiment. In place of the ground mover 400, a mover moving on water (for instance, a ship or a boat) may be selected.

The ground mover 400 may be designed to make direct communication with the GPS satellite 310.

In place of the third mover, that is, the mover 400 moving on ground, a stationary object or an object standing still (for instance, an object fixed on ground or on water) may be used. For instance, a stationary object fixed on ground includes a building and a road, and a stationary object fixed on water includes an observation equipment floating on sea.

For instance, the display panel 130 and the image pickup unit 210 may be set on a roof of a building (for instance, a government office), in which case, communication can be made by making optical communication between the building and the first drone 100 even when a communication network formed on ground or under ground (for instance, a cable network extending underground, a base station built on ground) becomes unusable.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2023-125381 filed on Aug. 1, 2023 including specification, claims, drawings and summary is incorporated herein by reference in its entirety.

What is claimed is:

1. A communication system to allow objects to make communication with each other, the objects including at least one first mover and at least one second mover, the communication system including:

a signal receiver;

an image pickup apparatus; and a controller, wherein:

the first mover includes the signal receiver, the controller and a display;

the second mover includes the image pickup apparatus and the controller;

the signal receiver makes communication with a satellite, and receives from the satellite a signal indicative of a position coordinate of the first mover;

the controller of the first mover makes patterns including a pattern indicative of a position coordinate of the first mover;

the display displays the patterns having been made by the controller of the first mover;

the image pickup apparatus photographs the patterns having been displayed by the display;

the controller of the second mover deciphers the patterns having been photographed by the image pickup apparatus to thereby control a position of the second mover in accordance with the thus deciphered patterns;

when the image pickup apparatus of the second mover photographs the pattern transmitted from the display of the first mover, the controller of the second mover causes the display of the second mover to transmit a confirmation pattern indicative of receiving the pattern;

the image pickup apparatus of the first mover photographs the confirmation pattern;

the display is designed to be rotatable or pivotable around an axis in which the display is equipped with the first mover, or movable on a body of the first mover along a predetermined path; and the controller of the first mover, when the first mover does not receive the confirmation pattern from the second mover within a predetermined period of time after having transmitted a pattern through the display of the first mover, causes the display of the first mover to rotate or pivot, or move.

2. The communication system as set forth in claim 1, wherein the controller of the second mover makes patterns including a pattern indicative of a position coordinate of the second mover, the second mover includes a display, the first mover includes an image pickup apparatus, the display of the second mover displays the patterns having been made by the controller of the second mover, the image pickup apparatus photographs the patterns having been displayed by the display of the second mover, and controller of the first mover deciphers the patterns having been photographed by the image pickup apparatus of the first mover.

3. The communication system as set forth in claim 1, wherein the controller of the second mover makes patterns including a pattern indicative of a position coordinate of the second mover, the second mover includes a display, the display displays the patterns having been made by the controller of the second mover, other second movers employ the image pickup apparatus to photograph the patterns having been displayed by the display-unit of the second mover, and controller of each of the other second movers deciphers the patterns having been photographed by the image pickup apparatus.

4. The communication system as set forth in claim 1, wherein the first mover includes six displays, the six displays being equipped with the first mover at forward and rear, left and right, and upward and downward in a direction in which the first mover moves.

5. The communication system as set forth in claim 1, wherein the display is designed to be rotatable or pivotable around an axis in which the display is equipped with the first mover.

6. The communication system as set forth in claim 1, wherein the display is designed to be movable on a body of the first mover along a predetermined path.

7. The communication system as set forth in claim 1, wherein the second mover includes six displays, the six displays being equipped with the second mover at forward and rear, left and right, and upward and downward in a direction in which the second mover moves.

8. The communication system as set forth in claim 1, wherein the display is designed to be pivotable around an axis in which the display is equipped with the second mover.

9. The communication system as set forth in claim 1, wherein the display is designed to be movable on a body of the second mover along a predetermined path.

10. The communication system as set forth in claim 1, wherein the controller of the first mover, when the first mover does not receive the confirmation pattern from the second mover within a predetermined period of time after having transmitted a pattern through the display of the first mover, increases a quantity of light of a pattern to be transmitted through the display of the first mover.

11. The communication system as set forth in claim 1, wherein the controller of the first mover, when the first mover receives the confirmation pattern from the second mover within a predetermined period of time after having transmitted a pattern through the display of the first mover, decreases a quantity of light of a pattern to be transmitted through the display of the first mover.

12. The communication system as set forth in claim 1, wherein the controller of the first mover controls a transmission interval of the patterns in accordance with whether the first mover receives the confirmation pattern from the second mover after a pattern has been transmitted through the display of the first mover.

13. The communication system as set forth in claim 1, wherein the objects further include at least one third mover and/or at least one object standing still on ground or on water, the third mover and/or the standing-still object including:

an image pickup apparatus; and a controller, the image pickup apparatus photographs the pattern displayed by the display of the first mover, and

the controller deciphers the pattern having been photographed by the image pickup apparatus.

14. The communication system as set forth in claim 13, wherein the controller of the third mover or the standing-still object makes patterns including a pattern indicative of a position coordinate of the third mover or the standing-still object, the third mover or the standing-still object includes a display, the first mover includes an image pickup apparatus, the display displays the pattern, the image pickup apparatus photographs the pattern displayed by the display of the third mover or the standing-still object, and the controllers of the first and second movers decipher the pattern having been photographed by the image pickup apparatus of the first and second movers.

15. The communication system as set forth in claim 13, wherein the third mover moves on ground or on water.

16. The communication system as set forth in claim 1, wherein both of the first and second movers comprises a flying object.

17. The communication system as set forth in claim 16, wherein the flying object comprises a drone.

18. A method of allowing a plurality of objects to make communication with one another, the objects including at least one first mover and at least one second mover, the method including:

the first mover receiving a signal from a satellite, the signal being indicative of a position coordinate of the first mover;

the first mover making patterns including a pattern indicative of the position coordinate of the first mover;

the first mover outside displaying the patterns through a display thereof, the display being designed to be rotatable or pivotable around an axis in which the display is equipped with the first mover, or movable on a body of the first mover along a predetermined path;

the second mover photographing the patterns;

the second mover deciphering the patterns to thereby control a position of the second mover in accordance with the thus deciphered patterns;

when the second mover photographs a pattern transmitted from the display of the first mover, the second mover transmitting a confirmation pattern indicative of receiving the pattern;

the first mover photographing the confirmation pattern; and the first mover, when the first mover does not receive the confirmation pattern from the second mover within a predetermined period of time after having transmitted a pattern through the display of the first mover, causing the display of the first mover to rotate or pivot, or move.

19. The method as set forth in claim 18, further including:

the second mover making patterns including a pattern indicative of a position coordinate of the second mover;

the second mover outside displaying the patterns;

the first mover photographing the patterns; and the first mover deciphering the thus photographed patterns.

20. The method as set forth in claim 18, further including:

the second mover making patterns including a pattern indicative of a position coordinate of the second mover;

the second mover outside displaying the patterns; and other second movers photographing the patterns having been displayed by the second mover; and the other second movers deciphering the thus photographed patterns to thereby control a position of itself in accordance with the deciphered patterns.

21. A drone capable of making communication with other drones, including:

a signal receiver;

a controller; and a display, wherein the signal receiver receives a signal from a satellite, the signal being indicative of a position coordinate of the drone, the controller makes patterns including a pattern indicative of a position coordinate of the drone, the display displays the thus made patterns to the other drones, the display is designed to be rotatable or pivotable around an axis in which the display is equipped with the drone, or movable on a body of the drone along a predetermined path, the controller, when the drone does not receive a confirmation pattern from another drone within a predetermined period of time after having transmitted the pattern through the display, causes the display to rotate or pivot, or move, and the confirmation pattern being transmitted from another drone to indicate that another drone received the pattern having been transmitted from the drone.

22. The drone as set forth in claim 21, wherein the other drones each includes:

a display; and an image pickup apparatus, wherein the display displays a pattern indicative of a position coordinate of itself, the image pickup apparatus photographs the pattern having been displayed by the display of each of the other drones, and the controller deciphering the thus photographed pattern.

\* \* \* \* \*